(12) United States Patent
Li et al.

(10) Patent No.: US 7,313,863 B2
(45) Date of Patent: Jan. 1, 2008

(54) METHOD TO FORM A CAVITY HAVING INNER WALLS OF VARYING SLOPE

(75) Inventors: Donghong Li, Milpitas, CA (US); Yoshitaka Sasaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 192 days.

(21) Appl. No.: 11/146,583

(22) Filed: Jun. 7, 2005

(65) Prior Publication Data
US 2006/0276039 A1 Dec. 7, 2006

(51) Int. Cl.
*H01R 9/00* (2006.01)
*H05K 3/00* (2006.01)
(52) U.S. Cl. .................. 29/842; 29/603.15; 29/603.16; 29/603.18; 29/829; 216/62; 216/66; 216/67; 360/125; 360/126; 360/317; 427/127; 427/128; 438/689
(58) Field of Classification Search ............. 29/603.11, 29/603.15, 603.16, 603.18, 829, 842; 360/125, 360/126, 317; 438/689; 216/62, 66, 67; 451/5, 41
See application file for complete search history.

(56) References Cited

U.S. PATENT DOCUMENTS

| | | | |
|---|---|---|---|
| 4,656,546 A | 4/1987 | Mallory | 360/110 |
| 4,672,493 A | 6/1987 | Schewe | 360/125 |
| 5,839,193 A * | 11/1998 | Bennin et al. | 29/896.9 |
| 6,504,675 B1 | 1/2003 | Shukh et al. | 360/125 |
| 6,510,024 B2 | 1/2003 | Otsuka et al. | 360/126 |
| 6,614,620 B2 | 9/2003 | Tagawa et al. | 360/126 |
| 6,620,669 B2 * | 9/2003 | Hijzen et al. | 438/206 |
| 6,854,175 B2 | 2/2005 | Sasaki | 29/603.15 |
| 2002/0041465 A1 | 4/2002 | Sasaki | 360/126 |
| 2004/0175596 A1 | 9/2004 | Inomata et al. | 428/693 |

* cited by examiner

*Primary Examiner*—Paul D. Kim
(74) *Attorney, Agent, or Firm*—Saile Ackerman LLC; Stephen B. Ackerman

(57) ABSTRACT

An improved mold, for use in the formation of a perpendicular magnetic write head, is described, together with a process for its manufacture. Conventional alumina is replaced by tantalum in the yoke portion of the mold. When both the tantalum and the alumina areas are simultaneously subjected to reactive ion etching, sloping sidewalls are obtained in the alumina area (write pole tip portion) whereas the sidewalls are almost vertical in the tantalum (yoke) area, resulting in a uniform neck height.

3 Claims, 7 Drawing Sheets

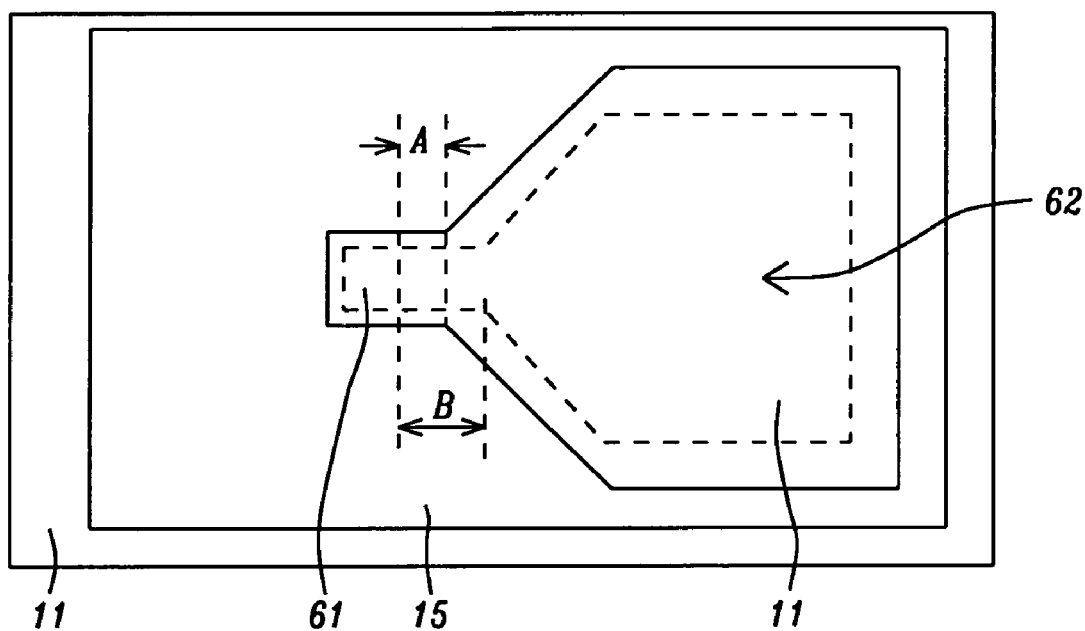
FIG. 1a – Prior Art

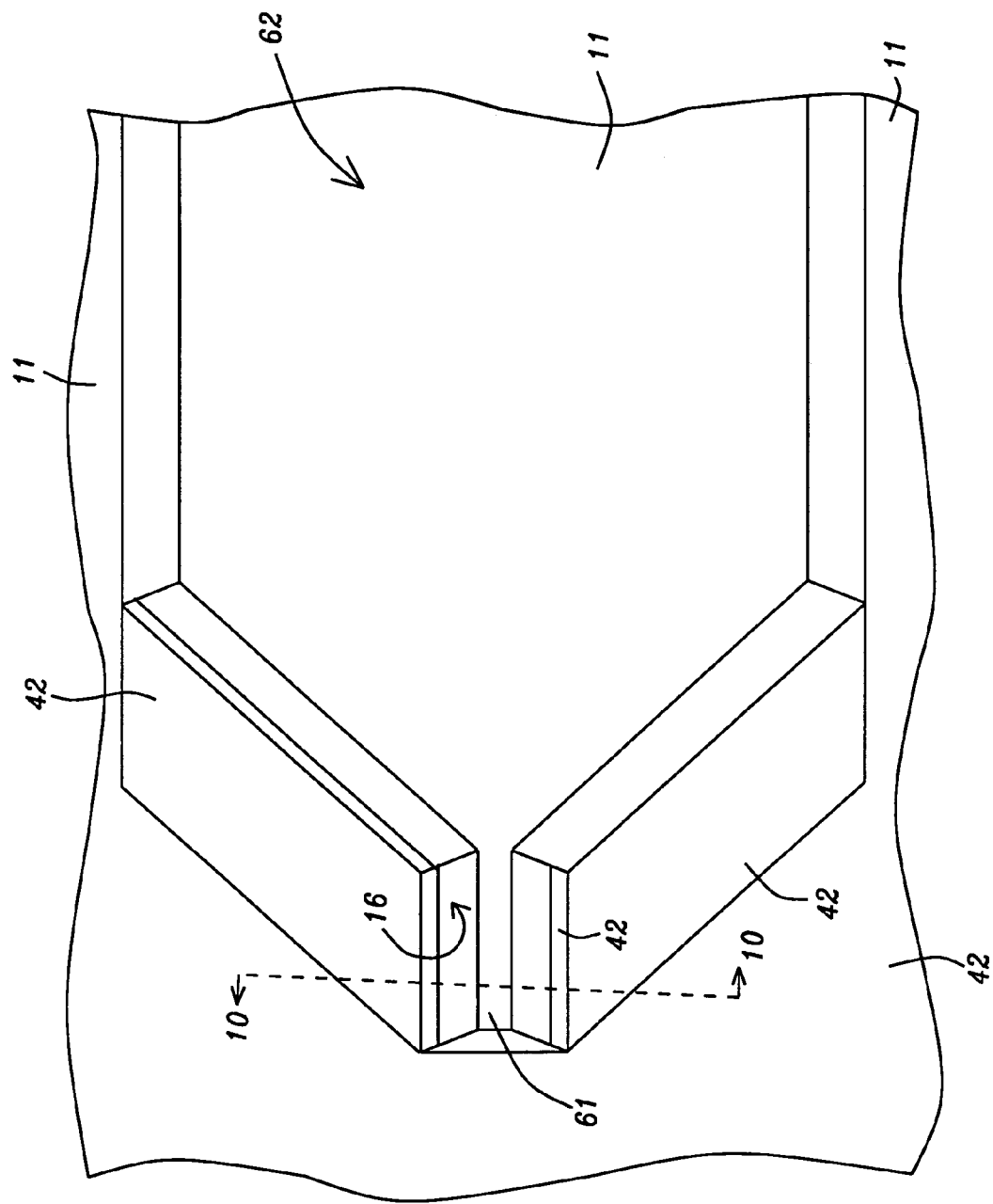
FIG. 1b – Prior Art

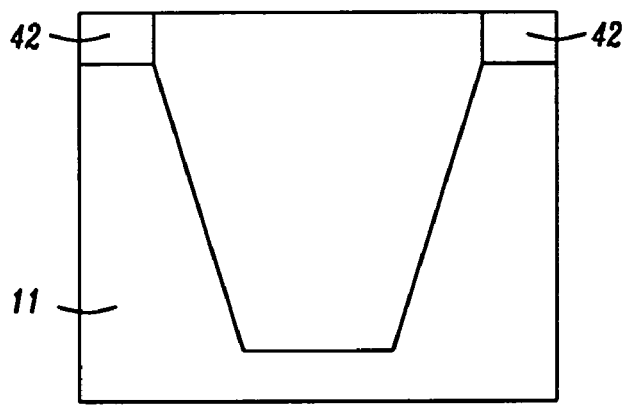
*FIG. 1c – Prior Art*
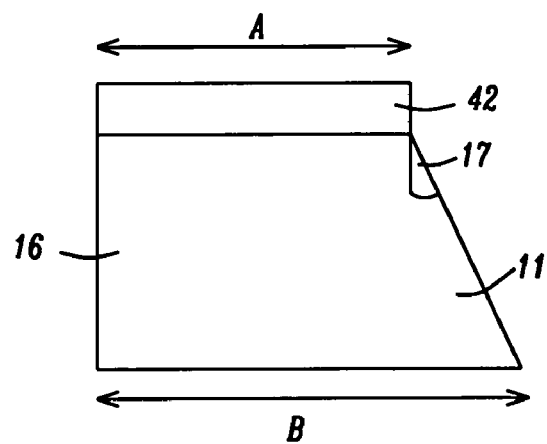
*FIG. 1d – Prior Art*
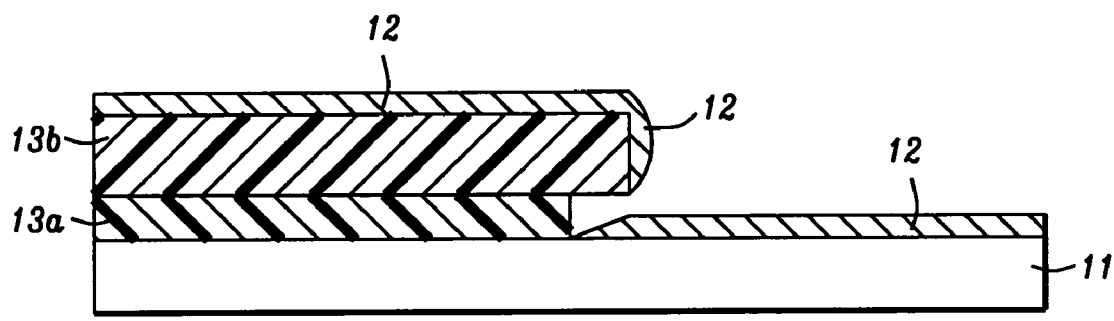
*FIG. 2*

METHOD TO FORM A CAVITY HAVING INNER WALLS OF VARYING SLOPE

FIELD OF THE INVENTION

The invention relates to the general field of magnetic disk recording with particular reference to formation of the write pole.

BACKGROUND OF THE INVENTION

For current cavity pole designs, RIE (Reactive Ion Etching) and $Al_2O_3$ are used to create the pole mold, including a bevel angle. One process phenomenon is that the bevel angle in the yoke area is greater than in the pole area (due to etch area differences). This, however, causes the NH (Neck Height) to be much longer at the bottom of the pole than at its top. Also, the magnetic volume at the flare point is significantly reduced. All of which will impact the head's writing performance.

FIGS. 1a-1d illustrate this problem. FIG. 1a is a plan view of a mold which will be used to form the write pole. Line 15 indicated the plane of the ABS (air bearing surface in the completed device). Neck height is the distance from the ABS to the flare point. In a typical mold formed using the methods of the prior art, it will be longer at the floor than at the top of the cavity FIG. 1b is an isometric view of FIG. 1a. Section cut 1c-1c corresponds to line 15 in FIG. 1a while layer 42 is a hard mask of tantalum that was used during RIE (reactive ion etching) to form the pole tip portion of mold area 61. FIG. 1d shows one of the sidewalls 16 in the tip area, illustrating how it slopes, at angle 17 (typically between about 7 and 12 degrees), at the flare point which results in the longer neck height B at the bottom of 61 relative to neck height A at the top.

This invention describes a new process to reduce the bevel angle in the yoke area while continuing to maintain the angle at the pole tip area, thereby resulting in a neck height that is the same at both levels. A routine search of the prior art was performed with the following references of interest being found:

U.S. Pat. No. 6,614,620 (Tagawa et al) describes using $Al_2O_3$ to etch the pole. In U.S. Pat. No. 6,510,024, Otsuka et al. disclose $Al_2O_3$ or other low etch rate material used to form the recording gap. U.S. Pat. No. 6,854,175 (Sasaki) shows that tantalum can be used in addition to alumina for the write gap layer while U.S. Pat. No. 6,504,675 (Shukh et al) discusses the slope angle of the pole sides.

U.S. Patent Application 2004/0175596 (Inomata et al) shows a tantalum protective layer on top of a stack including $Al_2O_3$. U.S. Patent Application 2002/0041465 (Sasaki) shows tantalum on alumina and RIE to form the pole. U.S. Pat. No. 4,672,493 (Schewe) and U.S. Pat. No. 4,656,546 (Mallory) disclose magnetic recording head pole designs.

SUMMARY OF THE INVENTION

It has been an object of at least one embodiment of the present invention to provide a method to form a cavity having inner walls of varying slope.

Another object of at least one embodiment of the present invention has been to provide a process to form a mold for use in the manufacture of a perpendicular magnetic pole write head.

These objects have been achieved by replacing the conventional alumina with tantalum in the yoke portion of the mold. When both the tantalum and the alumina areas are simultaneously subjected to reactive ion etching, sloping sidewalls are obtained in the alumina area (write pole portion) whereas the sidewalls are almost vertical in the tantalum (yoke) area.

BRIEF DESCRIPTION OF THE DRAWINGS

FIG. 1a is a plan view of a magnetic write pole mold of the prior art.

FIG. 1b is an isometric view of FIG. 1a.

FIG. 1c is an edge-on view of a sidewall in the pole tip area.

FIG. 1d is a cross-section made at the future site of the ABS.

FIG. 2 shows formation of a layer having a beveled edge as part of a liftoff process.

FIG. 8b is an isometric view of FIG. 8a.

DESCRIPTION OF THE PREFERRED EMBODIMENTS

Before cavity etching by RIE, tantalum is used in the yoke area instead of $Al_2O_3$, and also in the pole tip area. This is followed by the RIE process. Due to material etch property differences, the $Al_2O_3$ sidewalls will have the designed bevel angle, and the Ta sidewall will remain almost vertical. This is for NH (neck height) at the bottom of the pole to equal NH at the top of pole.

Compared with the existing cavity process that uses only $Al_2O_3$ for mold material, this invention uses two materials for RIE etching, $Al_2O_3$ at the pole tip and Ta at the yoke. Therefore, different bevel angles can be created for different portions. NH at the bottom of the pole will be the same as at the top of the pole, and the magnetic volume will be larger in the flare point area. There are three additional processes in order to deposit Ta. One is a bi-layer photo liftoff process used in conjunction with sputtered Ta, second is deposition of $Al_2O_3$, and the third is a polishing step to make the surface flat.

With the existing cavity pole process, NH at the bottom of the pole is longer than at the top. The present invention makes NH at the bottom the same as at the top of the pole, and the magnetic volume is also increased.

Now follows a detailed description of the process of the present invention. This description will also make clear the structure of the present invention.

Referring now to FIG. 2 the process of the invention begins with the formation of liftoff mask 13a/13b on substrate 11 (of a material such as alumina). Both layers of the liftoff mask are photo-sensitive but layer 13a is easily dissolved while layer 13b is etch resistant. Tantalum layer 12 is then deposited to a thickness between about 2,000 and 3,000 Angstroms, using a process such as sputtering, chemical vapor deposition (CVD), or ion beam deposition, which allows the deposited tantalum to extend beneath the overhang (of 13b over 13a) so that the tantalum has a wedge shaped edge that slopes towards the substrate at an angle of about 45 degrees. Following liftoff of mask 13a/b, tantalum layer 12 will remain in the area within which the yoke portion of the write head will later be formed.

Figure 3A:
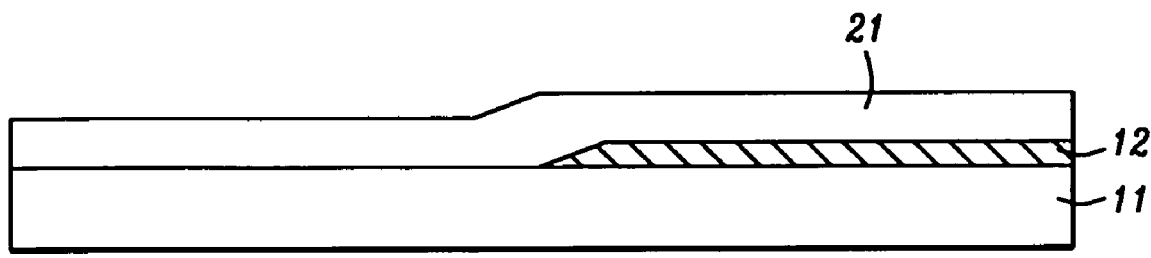
FIGS. 3a and 3b illustrate embedding the beveled edge of FIG. 2 in a layer.
Figure 3B:
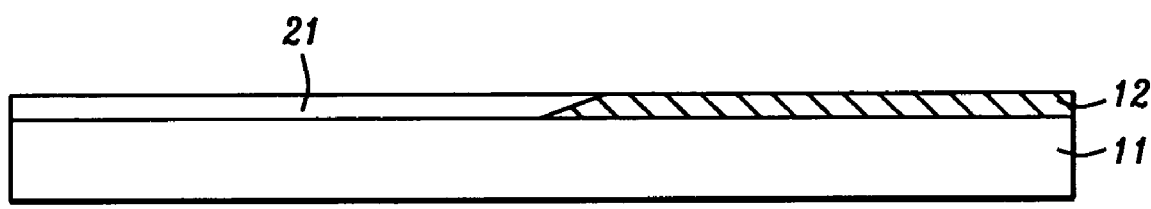
Figure 4:
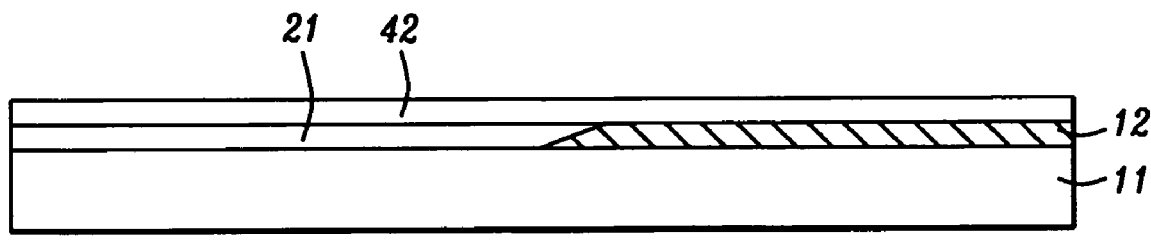
FIG. 4 shows a second layer over said embedded beveled edge layer.

Next, as seen in FIG. 3a, layer of alumina 21 is deposited on all exposed surfaces, to a thickness between about 3,000 and 4,000 Angstroms, following which the structure is planarized until tantalum layer 12 is just exposed, giving the structure the appearance illustrated in FIG. 3b. This is followed by the deposition of second tantalum layer 42, to a thickness between about 500 and 1,000 Angstroms, as shown in FIG. 4.

Figure 5:
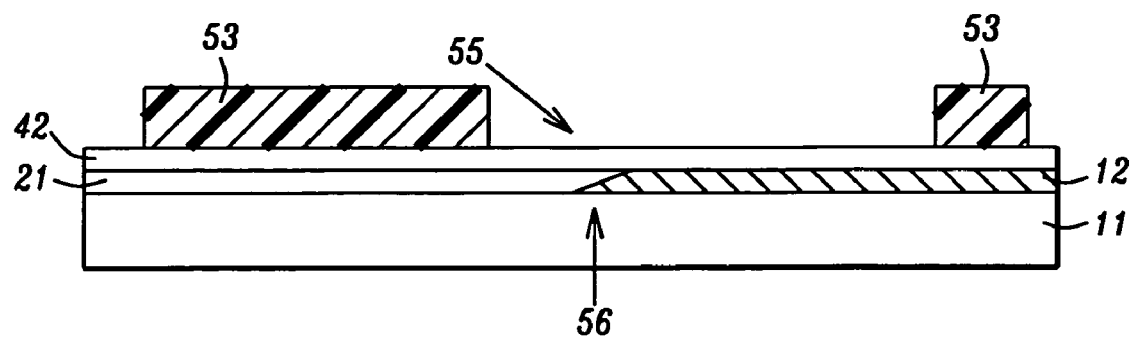
FIG. 5 is a cross-section of the mask used to etch the mold.
Figure 6:
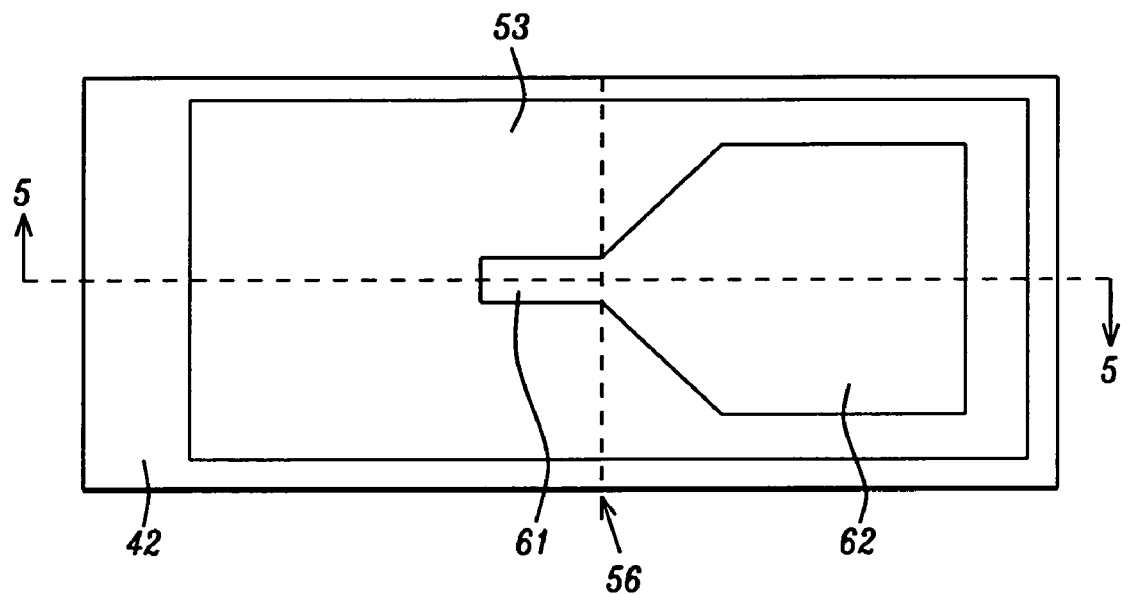
FIG. 6 is a plan view of the cross-section seen in FIG. 5.

Referring next to FIG. 5, photoresist layer 53 is deposited and patterned to form a mask that defines areas for the write pole and the yoke. The width of the write pole area is typically between about 0.15 and 0.25 microns while that of the yoke area (at its widest) is typically between about 10 and 15 microns. A key feature of the invention is that the flare point, where the narrow write pole first widens to become the yoke, is located directly over tantalum layer 12's sloping edge 56. This can be seen in FIG. 6 which is a plan view of the cross-section shown in FIG. 5, showing the relative positions of write pole 61 and yoke 62.

Now follows another key feature of the invention, namely the simultaneous etching, by means of a RIE process, of both the write pole and yoke areas. Our preferred RIE process has been source power of up to 1,200W, chuck power of 40W, at a pressure of 0.3 Pa for about 90 seconds. The chamber temperature was about 100° C. and the etchants were $Cl_2$ at a flow rate of about 15 sccm, $BCl_3$ at a flow rate of about 80 sccm, and $CF_4$ at a flow rate of about 12 sccm. It should be noted that similar, related, RIE processes could also have been effectively used.

At the completion of RIE, cavity 61/62 is formed in the alumina and tantalum layers. Because of the different responses of the alumina and the tantalum layers to the RIE process, cavity portion 61 (for the write pole tip) is found to have sidewalls that slope at an angle of between about 7 and 12 degrees while cavity portion 62 has sidewalls that slope an angle of up to about 4 degrees.

Figure 7:
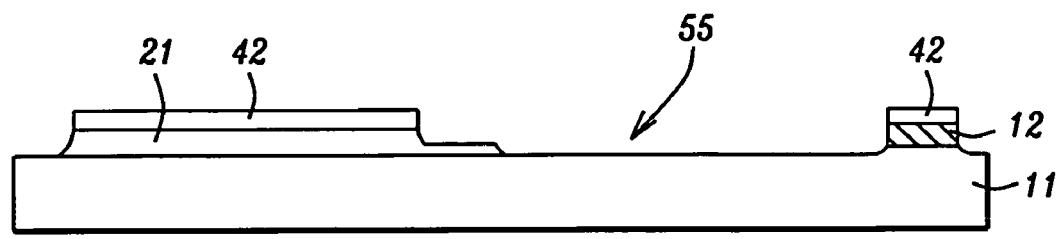
FIG. 7 shows the structure of FIG. 5 at the completion of etching.
Figure 8A:
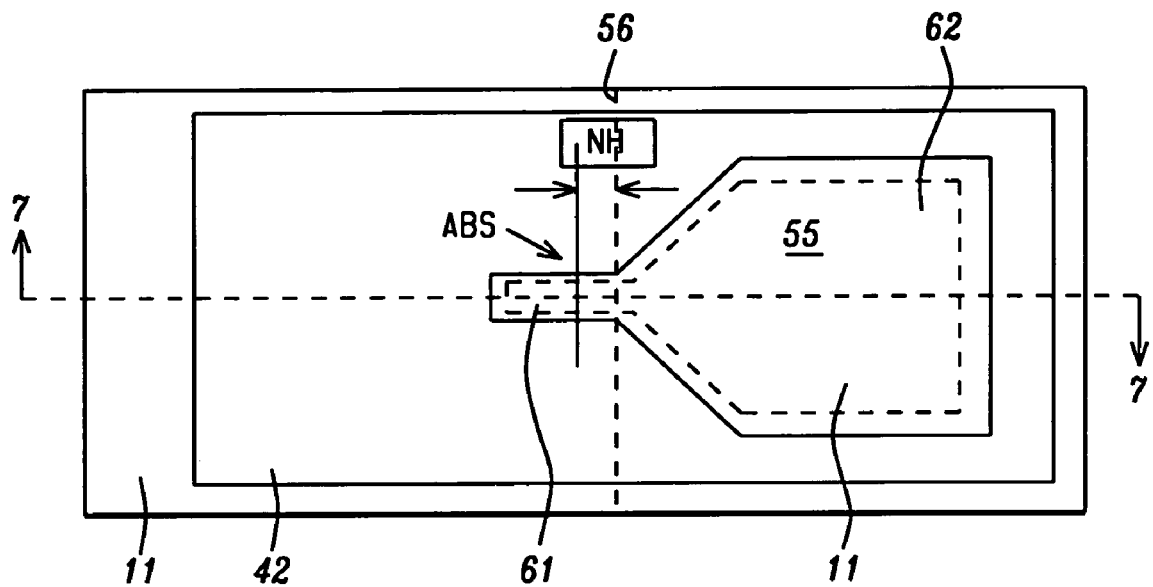
FIG. 8a shows the appearance of FIG. 6 when the latter is formed according to the process of the present invention. In particular, the neck height is the same at the top and the bottom of the write pole.

This difference in the slopes of the sidewalls in the two regions can be seen in FIG. 7, with layer 21 showing a significant slope while for layer 12 the slope is near vertical. FIG. 8a is a plan view of the section seen in FIG. seen in FIG. 7 while FIG. 8b is a partial isometric view similar to FIG. 1b, showing pole tip portion 61 (with sloping sidewalls) and yoke portion 62 (with steep sidewalls).

Figure 8B:
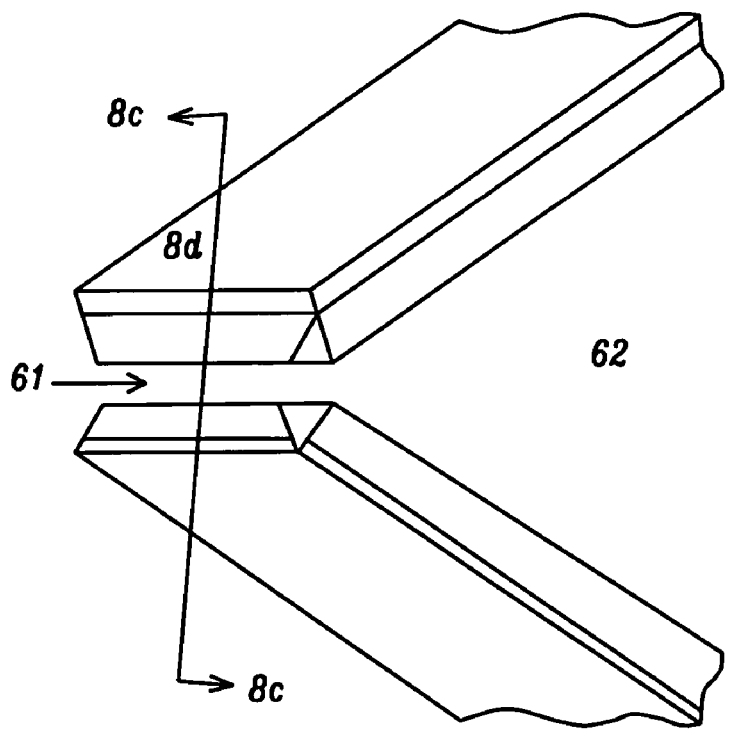
Figure 8C:
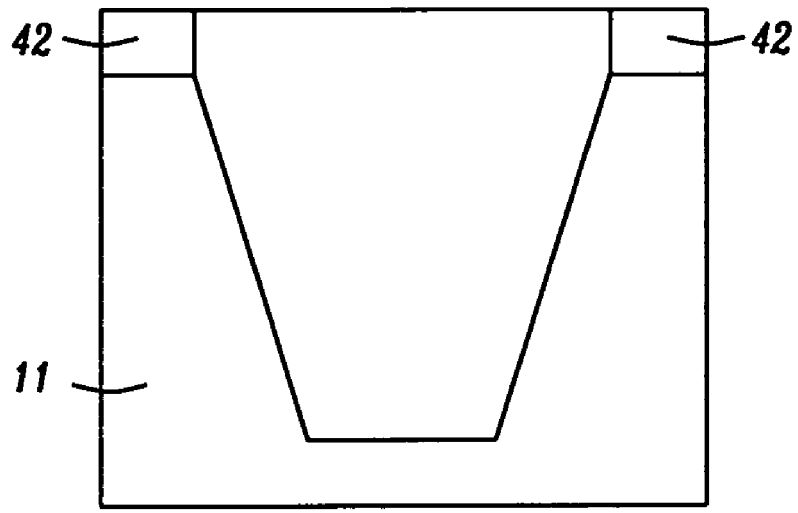
FIG. 8c is a cross-sections taken at the site of the future ABS.
Figure 8D:
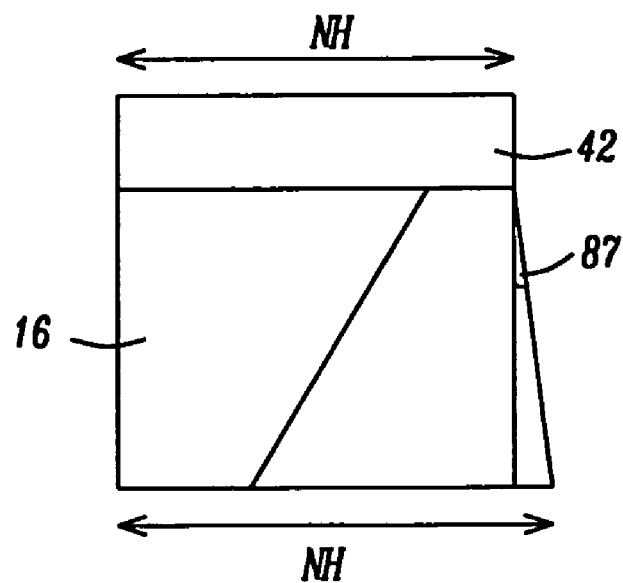
FIG. 8d is a view of part of the sidewall of the pole tip trench.

FIG. 8c is a cross-section taken at 8c-8c in FIG. 8b showing the afore-mentioned slope of the sidewalls at the site of the future ABS while FIG. 8d views the sidewall from inside the pole tip section where it can be seen that, due to the low value of etch angle 87, the neck height NH is essentially the same at the top as at the bottom.

What is claimed is:

1. A method to form a cavity having inner walls of varying slope, comprising:
   depositing on a substrate a layer of a first material and then patterning said layer to form a first area;
   depositing on said substrate a layer of a second material and then patterning said layer of a second material to form a second area that contacts the first area;
   forming on said first and second areas an etch resistant mask that defines said cavity; and
   simultaneously etching both of said areas by means of a reactive ion etching process that forms internal sidewalls having a different slope for said first material relative to said second material.

2. The method of claim 1 wherein said first material is alumina, said second material is tantalum, and said reactive ion process further comprises:
   for about 90 seconds,
   using a source power of up to 1,200W, a chuck power of about 40W, a pressure of about 0.3 Pa, a chamber temperature of about 100° C., and, as etchants, $Cl_2$ at a flow rate of about 15 sccm, $BCl_3$ at a flow rate of about 80 sccm, and $CF_4$ at a flow rate of about 12 sccm.

3. The method of claim 2 wherein said first material's sidewalls have a slope of between about 7 and 12 degrees and said second material's sidewalls have a slope of up to about 4 degrees.

* * * * *